United States Patent
Ferrari et al.

(10) Patent No.: US 11,553,651 B2
(45) Date of Patent: Jan. 17, 2023

(54) SYSTEM AND METHOD FOR DETERMINING PARAMETERS ASSOCIATED WITH BALE CHARGES FORMED WITHIN A PRE-COMPRESSION CHAMBER OF AN AGRICULTURAL BALER

(71) Applicant: CNH Industrial America LLC, New Holland, PA (US)

(72) Inventors: Luca Ferrari, Modena (IT); Luca Vincetti, Parma (IT); Moreno Maini, Modena (IT); Stefano Lenzini, Modena (IT); Lorenzo Rosa, Parma (IT)

(73) Assignee: CNH Industrial America LLC, New Holland, PA (US)

( * ) Notice: Subject to any disclaimer, the term of this patent is extended or adjusted under 35 U.S.C. 154(b) by 163 days.

(21) Appl. No.: 17/112,554

(22) Filed: Dec. 4, 2020

(65) Prior Publication Data
US 2021/0169010 A1    Jun. 10, 2021

(30) Foreign Application Priority Data
Dec. 10, 2019    (IT) ................... 102019000023520

(51) Int. Cl.
*A01F 15/08* (2006.01)
*G01N 22/04* (2006.01)
*A01F 15/10* (2006.01)

(52) U.S. Cl.
CPC .......... *A01F 15/0825* (2013.01); *A01F 15/10* (2013.01); *G01N 22/04* (2013.01); *A01F 2015/102* (2013.01)

(58) Field of Classification Search
CPC .... A01F 15/10; A01F 15/101; A01F 15/0825; A01F 2015/102; A01F 2015/103; A01F 2015/105; G01N 22/04
See application file for complete search history.

(56) References Cited

U.S. PATENT DOCUMENTS

| 2013/0167739 A1 | 7/2013 | Herron |
| 2013/0319263 A1 | 12/2013 | Roberts et al. |
| 2018/0084730 A1* | 3/2018 | Younk ................ G01N 33/0098 |
| 2018/0332773 A1 | 11/2018 | Roberts |

FOREIGN PATENT DOCUMENTS

| EP | 03353884 A2 | 2/1990 |
| EP | 3020266 A2 | 5/2016 |

OTHER PUBLICATIONS

Extended European Search Report for EP Application 20212861.7 dated Apr. 30, 2021 (6 pages).

* cited by examiner

*Primary Examiner* — Jimmy T Nguyen
(74) *Attorney, Agent, or Firm* — Peter Zacharias; Patrick Sheldrake (57) ABSTRACT

A method for determining parameters associated with bale charges formed within agricultural balers includes transmitting microwave signals through a charge of crop material located within a pre-compression chamber of an agricultural baler or into a wall of the pre-compression chamber. Additionally, the method includes determining at least one wave-related property associated with the microwave signals as transmitted through the charge of crop material or into the wall of the pre-compression chamber, and estimating a filling degree of at least a portion of the pre-compression chamber based at least in part on the at least one wave-related property associated with the microwave signals.

19 Claims, 6 Drawing Sheets

SYSTEM AND METHOD FOR DETERMINING PARAMETERS ASSOCIATED WITH BALE CHARGES FORMED WITHIN A PRE-COMPRESSION CHAMBER OF AN AGRICULTURAL BALER

FIELD OF THE INVENTION

The present subject matter relates generally to agricultural balers, and, more particularly, to systems and methods for estimating or determining one or more parameters associated with a charge of crop material or "bale charge" located within a pre-compression chamber of an agricultural baler, such as by estimating or determining the extent to which the pre-compression chamber is filled with the crop material forming the bale charge and/or by estimating or determining one or more properties of the bale charge (e.g., moisture content and/or density).

BACKGROUND OF THE INVENTION

Agricultural balers are used to consolidate and package crop material to facilitate storage and handling of the crop material for later use. In the case of hay, a mower-conditioner is typically used to cut and condition the crop material for windrow drying in the sun. In the case of straw, an agricultural combine discharges non-grain crop material from the rear of the combine (such as wheat or oat straw), which is subsequently picked up by the baler. The cut crop material is typically raked and dried, and a baler, such as a large square baler or round baler, straddles the windrows and travels along the windrows to pick up the crop material and form it into bales. For instance, on a large square baler, a pickup unit at the front of the baler gathers the cut and windrowed crop material from the ground. A packer unit is used to move the crop material from the pickup unit to a duct or pre-compression chamber. For example, the packer unit is typically configured to form a wad or charge of crop material within the pre-compression chamber, which is then transferred to a main baling chamber. Within the main baling chamber, a plunger compresses the charges of crop material to form a bale and, at the same time, gradually advances the bale toward the outlet of the baling chamber.

Currently, many agricultural balers include mechanical fin sensors located at the inlet of the pre-compression chamber to allow the degree of fullness (or "filling degree") of the pre-compression chamber to be estimated. However, such mechanical fin sensors only provide an indication of the filling degree at the inlet of the pre-compression chamber. Unfortunately, given the manner in which crop material is packed or compressed into the pre-compression chamber, instances often arise in which the area around the chamber inlet is quite full with crop material, but the portions of the pre-compression chamber that are further away from the inlet (e.g., at or adjacent to the outlet) have a significantly lower filling degree. In such instances, the mechanical fin sensors will indicate that the pre-compression chamber is completely full, thereby leading to the existing charge of crop material being transferred to main baling chamber. Such non-uniformly filled bale charges result in bales being formed within the main baling chamber that are not uniform in density and/or that do not exhibit the desired shape. Moreover, since the mechanical fin sensors correspond to contact-based sensors, such conventional sensors tend to modify the flow of crop material within the pre-compression chamber, which can lead to non-uniform filling of the chamber.

Accordingly, improved systems and related methods for determining one or more parameters associated with a charge of crop material located within a pre-compression chamber of an agricultural baler would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for determining parameters associated with bale charges formed within agricultural balers. The method includes transmitting microwave signals through a charge of crop material located within a pre-compression chamber of an agricultural baler or into a wall of the pre-compression chamber. Additionally, the method includes determining, with one or more computing devices, at least one wave-related property associated with the microwave signals as transmitted through the charge of crop material or into the wall of the pre-compression chamber, and estimating, with the one or more computing devices, a filling degree of at least a portion of the pre-compression chamber based at least in part on the at least one wave-related property associated with the microwave signals.

In another aspect, the present subject matter is directed to a system for determining parameters associated with bale charges formed within an agricultural bale. The system includes a pre-compression chamber of the agricultural baler, and a transmitter configured to transmit microwave signals through a charge crop material located within the pre-compression chamber or into a wall of the pre-compression chamber. In addition, the system includes a controller configured to determine at least one wave-related property associated with the microwave signals as transmitted through the charge of crop material or into the wall of the pre-compression chamber, and estimate a filling degree of at least a portion of the pre-compression chamber based at least in part on the at least one wave-related property associated with the microwave signals.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining parameters associated with charges of crop material or "bale charges" formed within an agricultural baler. Specifically, in several embodiments, the disclosed system and method utilizes a microwave-based sensor assembly to transmit microwave signals through a bale charge disposed within a pre-compression chamber of an agricultural baler. The microwave signals transmitted through the bale charge can then be detected (e.g., by a receiver antenna of the sensor assembly) to allow one or more wave-related properties of the microwave signals to be determined, such as the wave attenuation and/or the phase angle of the microwave signals following transmission through the bale charge. The wave-related properties may then be used to determine one or more parameters associated with the bale charge. Alternatively, a transmitter probe may be used to transmit microwave signals into a wall(s) of the pre-compression chamber to excite an electromagnetic resonance within the chamber. The transmitter probe (or a separate sensor probe) may then be used to determine one or more wave-related properties associated with the electromagnetic resonance (e.g., the resonant frequency of the chamber, a shift in the resonant frequency of the chamber, a quality factor variation, etc.)

In several embodiments, the data collected in association with the transmitted microwave signals may be used to determine or estimate the extent to which the pre-compression chamber is filled with crop material (i.e., the "filling degree" of the pre-compression chamber). For instance, in one embodiment, the wave attenuation of the microwave signals transmitted through the charge of crop material located within the pre-compression chamber may be correlated to the filling degree of the pre-compression chamber. Thus, by determining the wave attenuation of the microwave signals, the filling degree of the pre-compression chamber may be estimated or inferred. This information may then be used to control related aspects of the baling process. For instance, when the determined filling degree is indicative of the pre-compression chamber being fully or substantially full, the operation of an associated stuffer assembly may be controlled to cause the bale charge formed within the pre-compression chamber to be pushed from the chamber into the main baling chamber of the baler to allow a bale to be formed therein.

Moreover, the data collected in association with the transmitted microwave signals may also be used to determine or estimate one or more properties of the current bale charge being formed within the pre-compression chamber. For instance, by determining the phase angle of microwave signals transmitted through a given bale charge at two different frequencies, the phase angle differential or displacement between the two frequencies can be calculated, which may then be used to determine the dielectric properties associated with the bale charge (e.g., the real and imaginary parts of the dielectric constant associated with the bale). Similarly, by determining the resonant frequency shift and the quality factor of the cavity based on the excitation of the electromagnetic resonance, the dielectric properties associated with the bale charge (e.g., the real and imaginary parts of the dielectric constant associated with the bale) may be determined or estimated. Such dielectric properties may allow one or more related bale charge properties to be calculated, such as the moisture content of the bale charge and/or the density of the bale charge.

Figure 1:
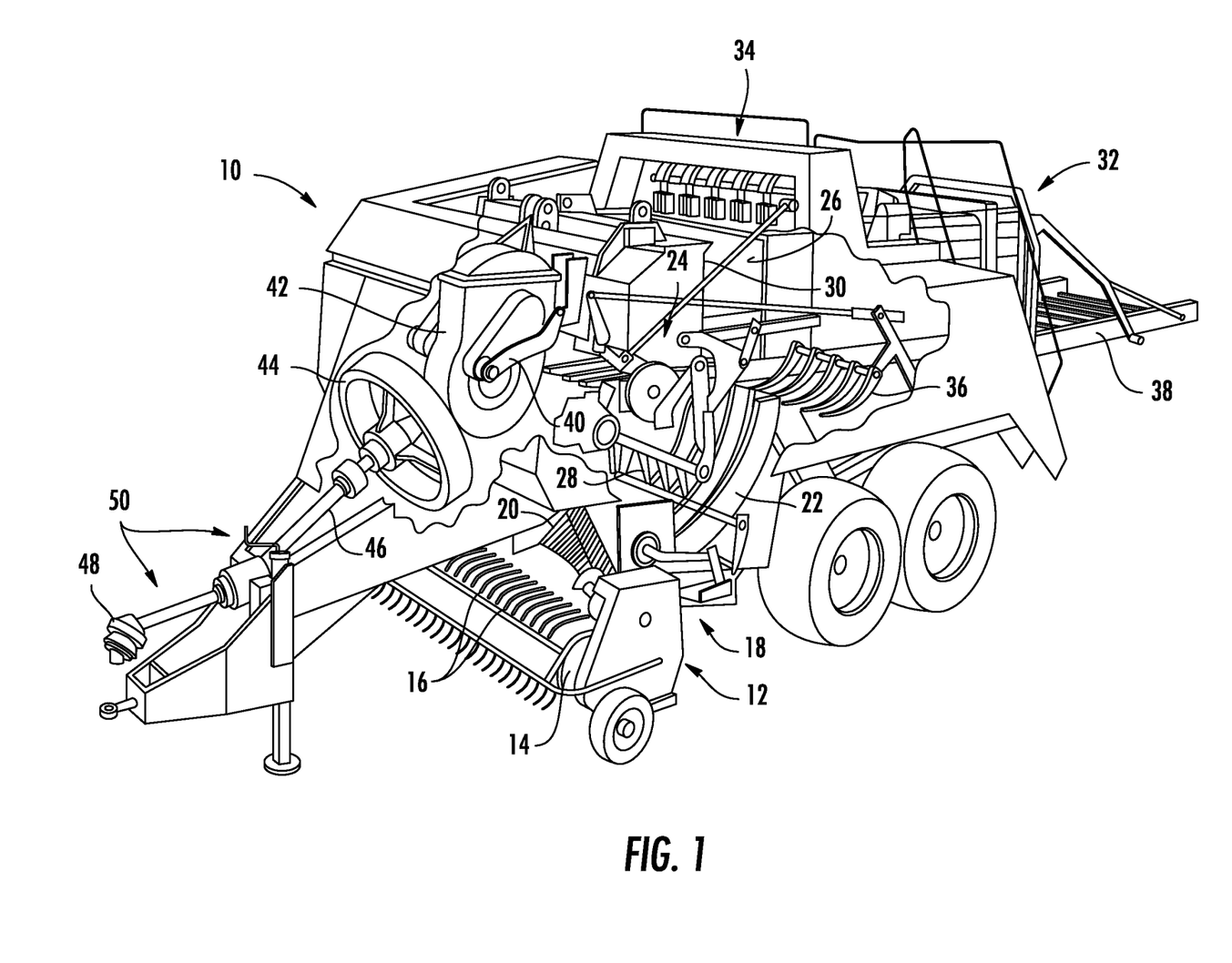
FIG. 1 illustrates a perspective, partially cut-away view of one embodiment of an agricultural baler in accordance with aspects of the present subject matter.
Figure 2:
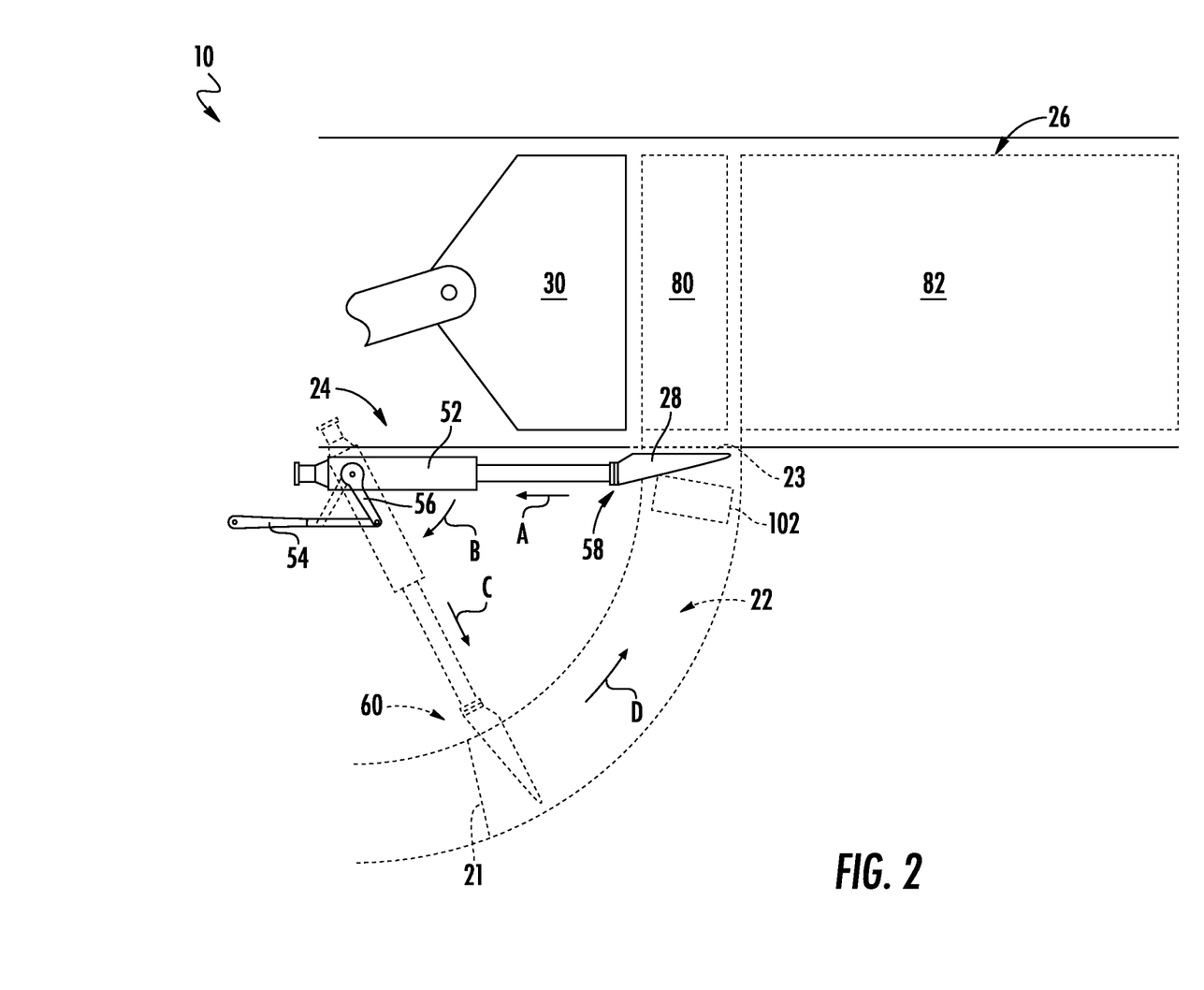
FIG. 2 illustrates a schematic, internal view of a pre-compression chamber and a main baling chamber of the baler shown in FIG. 1, particularly illustrating a microwave sensor assembly provided in operative association with the pre-compression chamber of the baler in accordance with aspects of the present subject matter.

Referring now to the drawings, FIGS. 1 and 2 illustrate differing views of one embodiment of an agricultural baler 10 in accordance with aspects of the present subject matter. Specifically, FIG. 1 illustrates a perspective, partially cutaway view of one embodiment of an agricultural baler 10. Additionally, FIG. 2 illustrates a schematic, internal view of the baler components that allow for the two-stages of crop compression within the baler 10. In the illustrated embodiment, the baler 10 is a configured as a rectangular baler. However, it should be appreciated that, in other embodiments, the baler 10 may have any other suitable baler configuration.

As particularly shown in FIG. 1, the baler 10 is configured to operate using a two-stage feeding system for intaking crop material and forming a bale therefrom. Specifically, crop material is lifted from windrows into the baler 10 using a pickup unit 12. In one embodiment, the pickup unit 12 includes a rotating pickup roll 14 with tines 16 which move the crop rearward toward a packer unit 18. An optional pair of stub augers (one of which is shown, but not numbered) is positioned above the pickup roll 14 to move the crop material laterally inward. Additionally, the packer unit 18 includes packer tines 20 which push the crop into an inlet 21 (FIG. 2) of a pre-compression chamber 22 to form a wad or charge of crop material. Specifically, the packer tines 20 intertwine the crop together and pack the crop within the pre-compression chamber 22, with the pre-compression chamber 22 and the packer tines 20 generally functioning as the first stage of crop compression within the baler 10.

Once a sufficient charge of crop material or "bale charge" 80 (FIG. 2) has been formed within the pre-compression chamber 22, a stuffer assembly 24 moves the charge of crop material through an outlet 23 (FIG. 2) of the pre-compression chamber 22 to a main baling chamber 26 of the baler 10. As particularly shown in FIG. 2, the stuffer assembly 24 includes stuffer forks 28 which thrust the bale charge 80 directly in front of a plunger 30, which reciprocates back and forth relative to the baling chamber 26 to compress the charge of crop material 80 into a bale 82. The stuffer forks 28 are returned to their original stationary state after the bale charge 80 has been moved into the baling chamber 26. The plunger 30 compresses the charges of crop material to form a bale 82 and, at the same time, gradually advances the bale 82 towards an outlet 32 of the baling chamber 26. The baling chamber 26 and the plunger 30 generally function as the second stage if crop compression within the baler 10.

It should be appreciated that the stuffer forks 28 of the stuffer assembly 26 may generally be configured to be actuated relative to the pre-compression chamber 22 using any suitable actuation means known in the art. For instance, in the embodiment shown in FIG. 2, the stuffer assembly 26 includes a first stuffer actuator 52 (e.g., a hydraulic cylinder or motor) coupled to the stuffer forks 28 and a second stuffer actuator 54 (e.g., a hydraulic cylinder or motor) coupled to the first stuffer actuator 52 via a lever 56. In such an embodiment, by controlling the extension/retraction of the stuffer actuators 52, 54, the stuffer forks 28 may be moved or actuated relative to the pre-compression chamber 22 to allow a charge of crop material to be formed therein and to also permit the charge of crop material to be pushed upwardly into the main baling chamber 26.

For instance, the stuffer forks 28 are shown in FIG. 2 at a loading position 58 (indicated by the solid lines) at which the stuffer forks 28 essentially cover or close the outlet 23 of the pre-compression chamber 22, thereby allowing crop material entering the chamber 22 via the chamber inlet 21 to be compressed therein. Once a sufficient charge of crop material has been compressed into the chamber 22, the first stuffer actuator 52 may be initially retracted to move the stuffer forks 28 away from the chamber outlet 23 (e.g., in direction A), which then allows the first stuffer actuator 52 (and, thus, the stuffer forks 28 coupled thereto) to be pivoted downwardly (e.g., in pivot direction B) via retraction of the second stuffer actuator 54. Once the stuffer forks 28 have been pivoted downwardly to their lowermost position, the first stuffer actuator 52 can then be extended to actuate the stuffer forks 28 outwardly again towards the pre-compression chamber 22 (e.g., in direction C) to the charging position 60 (indicated by the dashed lines). Thereafter, with the first stuffer actuator 52 maintained at the extended position, the second stuffer actuator 54 can be extended to pivot the stuffer forks 28 upwardly (e.g., in pivot direction D), thereby allowing the stuffer forks 28 to sweep upwardly along a curved path following the curved shape of the pre-compression chamber 22 to push the charge of crop material through the chamber outlet 23 and into the baling chamber 26. With the stuffer forks 28 back to the loading position 58, the process can be repeated to allow a new charge of material to be compressed within the pre-compression chamber 22 and subsequently pushed into the main baling chamber 26 via actuation of the stuffer forks 28.

It should also be appreciated that the plunger 30 may be configured to be actuated relative to the baling chamber 26 using any suitable reciprocation or actuation means known in the art. For instance, in the embodiment shown in FIG. 1, the plunger 30 is connected via a crank arm 40 to a gear box 42. The gear box 42 is driven by a flywheel 44, which, in turn, is connected via a drive shaft 46 with a power take-off (PTO) coupler 48. The PTO coupler 48 is detachably connected with the PTO spline at the rear of the associated traction unit, such as a tractor (not shown). The PTO coupler 48, the drive shaft 46, and the flywheel 44 collectively define a portion of a driveline 50, which provides rotative power to the gearbox 42. The flywheel 44 has a sufficient mass to carry the plunger 30 through a compression stroke as power is applied to the drive shaft 46 by the traction unit (not shown).

When a formed bale 82 reaches a predetermined size within the baling chamber 26 (e.g., as determined via a suitable measurement device, such as a star wheel), knotters 34 (FIG. 1) can be actuated which wrap and tie twine around the bale while it is still in the baling chamber 26. Needles 36 (FIG. 1) are used to bring the lower twine up to the knotters 34 and the tying process takes place. The twine is cut and the formed bale is ejected from a discharge chute 38 (FIG. 1) of the baler as a new bale is being formed within the baling chamber 26.

Additionally, as will be described in greater detail below, in several embodiments, a sensor assembly (indicated by dashed lines 102 in FIG. 2) may be provided in operative association with the pre-compression chamber 22 for sensing or detecting one or more parameters associated with the bale charge 80 being formed therein. Specifically, in accordance with aspects of the present subject matter, the sensor assembly 102 may, in one embodiment, correspond to a microwave-based sensor assembly configured to transmit microwave signals through each bale charge 80 being formed within the pre-compression chamber 22 (or through a wall(s) of the chamber 22 itself). The detected properties of the microwave signals transmitted through each bale charge 80 (or the wall(s) of the chamber 22) may then be used at least in part to estimate or infer one or more parameters associated with the charge of crop material located within the pre-compression chamber 22, such as the extent to which the pre-compression chamber 22 is filled with crop material forming the bale charge 82 (i.e., the "filling degree") and/or one or more properties of the bale charge 80 (e.g., the moisture content and/or the density of the bale charge 80).

As shown in FIG. 2, the sensor assembly 102 is generally located within or adjacent to the pre-compression-chamber 22, such as by mounting components of the sensor assembly 102 to a wall(s) of the pre-compression chamber 22. As a result, the sensor assembly 102 may be used to detect parameters associated with the bale charge 80 being formed within the chamber 22. However, in other embodiments, the sensor assembly 102 may be positioned at any other suitable location within the baler 10 and/or may be mounted or coupled to any other suitable component of the baler 10 that allows the sensor assembly 102 to generally function as described herein.

Figure 3:
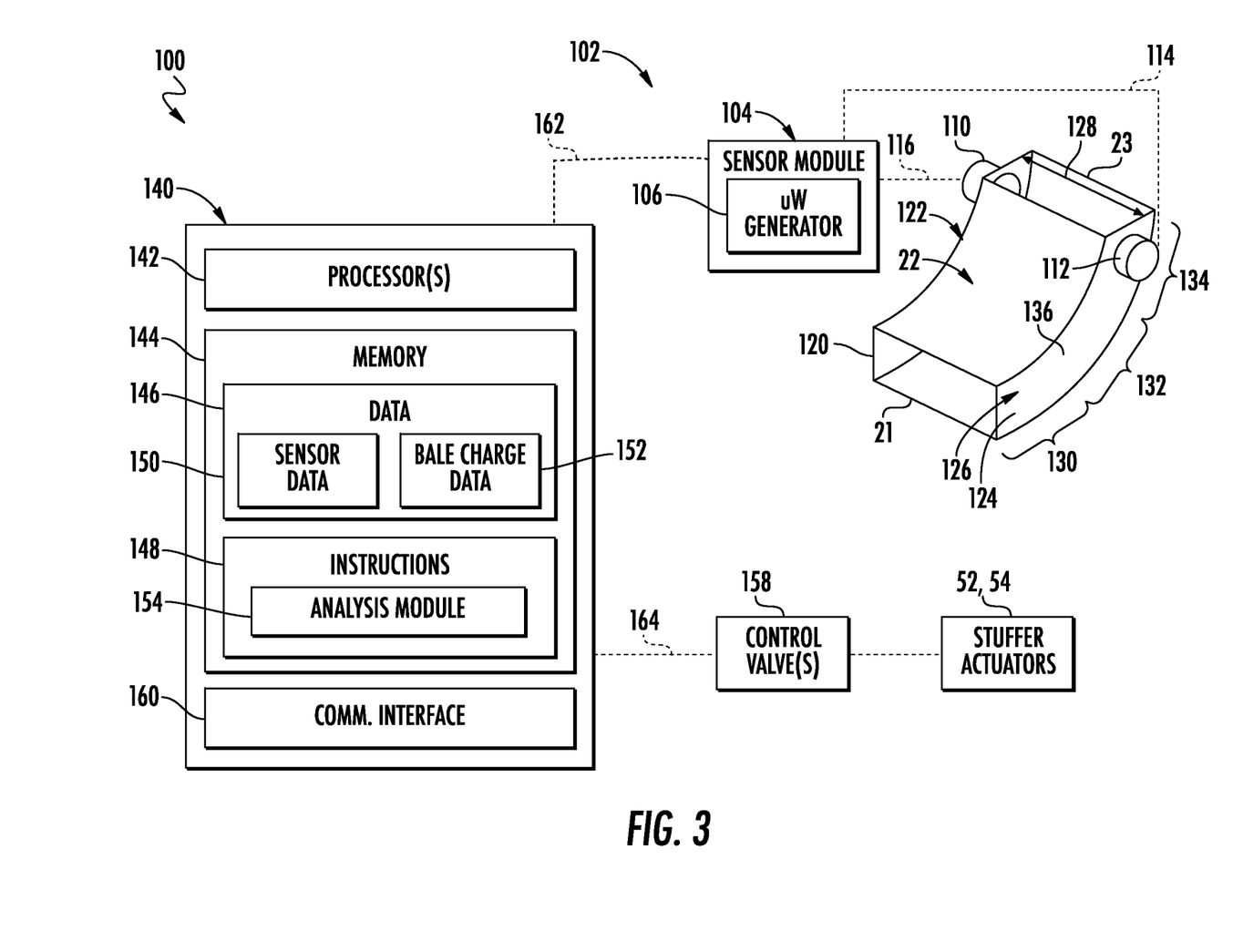
FIG. 3 illustrates a schematic view of one embodiment of a system for determining one or more parameters of a charge of crop material formed within a pre-compression chamber of an agricultural baler in accordance with aspects of the present subject matter.

Referring now to FIG. 3, a schematic view of one embodiment of a system 100 for monitoring or determining one or more parameters associated with a charge of crop material or "bale charge" formed within a pre-compression chamber of an agricultural baler is illustrated in accordance with aspects of the present subject matter. For purposes of description, the system 100 will generally be described herein with reference to baler 10 described above with reference to FIGS. 1 and 2. However, it should be appreciated that the disclosed system 100 may generally be utilized with any baler have any suitable baler configuration to monitor one or more bale properties of a bale formed therein.

In several embodiments, the system 100 may include a microwave-based sensor assembly 102 configured to both generate microwave signals for transmission through a bale charge located within a pre-compression chamber of an agricultural baler (e.g., pre-compression chamber 22 of FIGS. 1 and 2) and subsequently receive or detect the microwave signals following transmission through the bale charge. For instance, as shown in FIG. 3, the sensor assembly 102 includes a sensor module 104 having a microwave generator 106 associated therewith for generating microwave output signals. Specifically, in accordance with aspects of the present subject matter, the microwave generator 106 may be configured to generate microwave signals at one or more frequencies for transmission through a charge of crop material location within the pre-compression chamber 22. It should be appreciated that the sensor module 104 may also include further components for processing and/or analyzing the microwave signals generated by the microwave generator 106 and/or the signals detected by or received back at the sensor module 104. For instance, in one embodiment, the sensor module 104 may include a power divider, a directional coupler, and/or any other suitable components typically included within a radio-frequency (RF) box.

In addition, the sensor assembly 102 includes both a first antenna 110 (hereinafter referred to as the "transmitter antenna") and a second antenna 112 (hereinafter referred as the "receiver antenna") communicatively coupled to the sensor module 104 (e.g., via communicative links 114, 116), with the transmitter antenna 110 being configured to transmit the microwave signals generated by the microwave generator 106 through the current bale charge located within the pre-compression chamber 22 and the receiver antenna 112 being configured to receive the microwave signals transmitted through the bale charge by the transmitter antenna 110. In the illustrated embodiment, the sensor assembly 102 only includes a single pair of antennas 110, 112 for transmitting and receiving microwave signals. However, in other embodiments, the sensor assembly 102 may include any other suitable number of antenna pairs for transmitting and receiving microwave signals, such as two or more antenna pairs. For instance, as will be described below with reference to FIG. 4, the sensor assembly 102 may include various pairs of antennas 110, 112 spaced apart along the length of the pre-compression chamber 22. In such an embodiment, the transmitter antennas 110 of the antenna pairs may be configured to be communicatively coupled to a common microwave generator (e.g., the microwave generator 106 shown in FIG. 3) or to respective microwave generators forming part of the sensor module 104 (or of respective sensor modules).

In several embodiments, the transmitter and receiver antennas 110, 112 are configured to be positioned along opposite sides of the bale charge being formed within the baler 10, thereby allowing microwave signals to be transmitted from one side of the bale charge and received on the other side of the bale charge. Specifically, in one embodiment, the transmitter and receiver antennas 110, 112 may be positioned along opposite sides of the pre-compression chamber 22 such that microwave signals can be transmitted through the bale charge being formed therein. For instance, as shown in the illustrated embodiment, the transmitter antenna 110 is coupled or positioned relative to or otherwise provided in operative association with a first sidewall 120 defining a first side 122 of the pre-compression chamber, while the receiver antenna 112 is coupled or positioned relative to or otherwise provided in operative association with an opposed second sidewall 124 defining an opposite, second side 126 of the pre-compression chamber 22. In such an embodiment, as a bale charge is being formed within the pre-compression chamber 22, the transmitter antenna 110 may be used to transmit microwave signals from the first side 122 of the pre-compression chamber 22 through the bale charge for receipt by the receiver antenna 112 at the opposed second side 126 of the pre-compression chamber 22. As a result, the microwave signals may be transmitted through the entire lateral width of the bale charge (e.g., as indicated by width 128 in FIG. 3).

Additionally, in several embodiments, the transmitter and receiver antennas 110, 112 may be configured to be positioned relative to the pre-compression chamber 22 so as to be located closer to the chamber outlet 23 than the chamber inlet 21. For example, in one embodiment, the pre-compression chamber 22 may include a lower region 130, a central region 132, and an upper region 134, with the lower region 132 extending along the length of the pre-compression chamber 22 from the chamber inlet 21 to the central region 132 and the upper region 134 extending along the length of the pre-compression chamber 22 from the central region 132 to the chamber outlet 23. In such an embodiment, the central region 132 may be defined across a central portion of the length of the pre-compression chamber 22 centered about a centerpoint 136 of the arc length of the chamber 22. The central region 132 may, for example, corresponds to a centrally located one-third of the length of the pre-compression chamber 22, while the lower and upper regions 130, 134 correspond to the remaining lower and upper one-thirds, respectively, of the length of the pre-compression chamber 22. As shown in FIG. 3, in one embodiment, the transmitter and receiver antennas 110, 112 are positioned within the upper region 134 of the pre-compression chamber 22 adjacent to the chamber outlet 23. As such, the microwave signals transmitted and received by the antennas 110, 112 may be used, for example, to determine the filling degree of the upper region 134 of the pre-compression chamber 22 (i.e., the extent to which the upper region 134 is filled with crop material forming the current bale charge), which may provide an indication of the overall filling degree of the pre-compression chamber 22.

It should be appreciated that, in other embodiments, the transmitter and receiver antennas 110, 112 may be disposed at any other suitable location relative to the pre-compression chamber 22 that allows the antennas 110, 112 to generally function as described herein. For instance, as opposed to being located along the lateral sides 122, 126 of the pre-compression chamber 22, the antennas 110, 112 may be positioned along the top and bottom sides of the pre-compression chamber 22 such that microwave signals are transmitted through the current bale charge along its height. Alternatively, as will be described below with reference to FIG. 4, the antennas 110, 112 may be installed relative to the pre-compression chamber 22 at various different locations along its length.

Moreover, in several embodiments, the system 100 may also include one or more processor-based or computing devices for receiving and subsequently processing the microwave-based data generated by the sensor assembly 102. For instance, as shown in FIG. 3, the system 100 includes a controller 140 communicatively coupled to one or more components of the sensor assembly 102 (e.g., the sensor module 104) for receiving microwave-based data from the sensor assembly 102 associated with the microwave signals transmitted through the bale charge located within the pre-compression chamber 22 and subsequently detected by the receiver transmitter 112. In such an embodiment, the controller 140 may be configured to analyze the microwave-based data received from the sensor assembly 102 to determine one or more wave-related properties of the microwave signals received by the receiver transmitter 112, such as the wave attenuation and the phase angle of the microwave signals transmitted through a charge of crop material and received at the receiver transmitter 112. As will be described below, by determining such wave-related properties for the microwave signals transmitted through a charge of crop material, the controller 140 may be configured to determine or estimate one or more properties associated with the bale charge, such as the filling degree of the bale charge within the pre-compression chamber and/or one or more bale charge properties (e.g., moisture content and/or density).

In general, the controller 140 may correspond to any suitable processor-based device(s), such as a computing device or any combination of computing devices. Thus, as shown in FIG. 3, the controller 140 may generally include one or more processor(s) 142 and associated memory devices 144 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 144 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 144 may generally be configured to store information accessible to the processor(s) 142, including data 146 that can be retrieved, manipulated, created and/or stored by the processor(s) 142 and instructions 148 that can be executed by the processor(s) 142.

In several embodiments, the data 146 may be stored in one or more databases. For example, the memory 144 may include a sensor database 150 for storing data received from one or more sensors of the disclosed system 100. For example, in one embodiment, the microwave-based data received from the microwave sensor assembly 102 may be stored within the sensor database 150. Additionally, suitable data derived from the microwave-based data may also be stored within the sensor database 150. For instance, in one embodiment, data associated with any wave-related properties of the microwave signals received by the receiver transmitter 112 may be stored within the sensor database 150, such as by storing the wave attenuation and the phase angle of the microwave signals transmitted through each bale charge within the sensor database 150

Additionally, as shown in FIG. 3, the memory 144 may include a bale charge database 152 for storing information related to one or more parameters associated with each bale charge being analyzed using the disclosure system 100. For instance, as indicated above, by analyzing the wave-related properties for the microwave signals transmitted through a bale charge located within the pre-compression chamber 22, the extent to which the pre-compression chamber 22 is filled with crop material (i.e., the "filling degree" of the chamber 22) may be estimated or inferred. Additionally, as will be described below, the wave-related properties for the microwave signals transmitted through each bale charge may also be used to determine the dielectric properties of the associated bale charge (e.g., the real and imaginary parts of the dielectric constant), which can then be used to estimate or infer one or more other properties for the bale charge, such as the moisture content of the bale charge and/or the density of the bale charge. In such embodiments, the various parameters determined in association with each bale charge may be stored within the bale charge database 152.

Referring still to FIG. 3, in several embodiments, the instructions 148 stored within the memory 144 of the controller 140 may be executed by the processor(s) 142 to implement a data analysis module 154. In general, the data analysis module 154 may be configured to analyze the data received from any sensors of the disclosed system 100. Specifically, in several embodiments, the data analysis module 154 may be configured to analyze the microwave-based data received from the microwave sensor assembly 102 to determine one or more wave-related properties of the microwave signals transmitted through each bale charge and subsequently received by the receiver antenna 112. For instance, in one embodiment, the data analysis module 154 may be configured to compare the amplitude of the microwave signal received at the receiver antenna 112 to the original amplitude of the microwave signal transmitted from the transmitter antenna 110 to determine the reduction in amplitude of the signal as it was transmitted through the bale charge (i.e., the wave attenuation). In addition to the wave attenuation, the data analysis module 154 may be configured to analyze the microwave-based data to determine the phase angle of the microwave signal received at the receiver antenna 112 (e.g., using known signal analysis techniques). As will be described below, in one embodiment, the system 100 may be used to transmit microwave signals through each bale charge being analyzed at two or more different frequencies. Thus, it should be appreciated that the data analysis module 154 may, for example, be configured to calculate the wave attenuation and phase angle associated with the microwave signals transmitted through the bale charge at each frequency.

Moreover, in several embodiments, the data analysis module 154 may also be configured to determine one or more parameters associated with each bale charge being analyzed. Specifically, in several embodiments, the data analysis module 154 may be configured to determine such parameters based on the wave-related properties of the microwave signals transmitted through the bale charge, such as the wave attenuation and phase angle at each frequency. For instance, the wave attenuation of the microwave signals transmitted through each bale charge may be analyzed to estimate or infer the filling degree of the pre-compression chamber 22. Specifically, as the portion of the pre-compression chamber 22 through which the microwave signals are being transmitted fills with crop material, the attenuation of the microwave signals will increase. Thus, by analyzing the wave attenuation, the degree to which the surrounding portion of the pre-compression chamber 22 is filled with crop material can be determined. For instance, a look-up table or similar relationship may be established that correlates the wave attenuation with a fill percentage associated with the filling degree of the pre-compression chamber 22, with the fill percentage increasing with increases in the wave attenuation. In such an embodiment, a wave attenuation of a given amount would be expected when the filling degree of the surrounding portion of the pre-compression chamber 22 is 25% full, while a wave attenuation of a larger amount would be expected when the filling degree of the surrounding portion of the pre-compression chamber 22 is 75% full.

In the illustrated embodiment, the positioning of the antennas 110, 112 may allow the data analysis module 154 to directly determine the filling degree of the adjacent portion of the pre-compression chamber 22, such as the filling degree of the upper region 134 of the pre-compression chamber 22. However, by determining the filling degree of the upper region 134 of the pre-compression chamber 22, the data analysis module 154 may also be configured to estimate or infer the overall filling degree or fullness of the entire pre-compression chamber 22. Specifically, given the manner in which crop material is loaded into the pre-compression chamber 22, the lower and central regions 130, 132 of the pre-compression chamber 22 tend to fill-up first with crop material, with the upper region 134 of the pre-compression chamber 22 typically being the last portion of the pre-compression chamber 22 to fill with crop material. Thus, when the filling degree of the upper region 134 of the pre-compression chamber 22 exceeds a given threshold associated with a full or substantially filled chamber (e.g., as determined based on the microwave signals transmitted and received by the antennas 110, 112), it may be inferred or estimated that the remainder of the pre-compression chamber 22 is also full or substantially filled with crop material. For instance, in one embodiment, the upper region 134 of the pre-compression chamber 22 may be determined to be full or to otherwise exhibit a maximum filling degree when the wave attenuation of the microwave signals transmitted through the bale charge is equal to or exceeds a predetermined maximum attenuation threshold. In such an embodiment, when the data analysis module 154 determines that the wave attenuation is equal to or exceeds the predetermined threshold (and, thus, the upper region 134 of the pre-compression chamber 22 is full of crop material), it may also be inferred or estimated that the remainder of the pre-compression chamber 22 is similarly full of crop material.

It should be appreciated that, as an alternative to estimating or inferring the overall filling degree or fullness of the pre-compression chamber 22 based on the filling degree of a specific region of the chamber 22 (e.g., the upper region 134), the filling degree or fullness of each respective region 130, 132, 134 of the pre-compression chamber 22 may be determined. For instance, as will be described below with reference to FIG. 4, multiple pairs of antennas 110, 112 may be spaced apart along the length of the pre-compression chamber 22 to allow the filling degree or fullness of the chamber 22 to be determined at various different locations.

Moreover, as will be described in greater detail below, the data analysis module 154 may also be configured to determine one or more bale charge properties associated with each bale charge being analyzed based on the wave-related properties of the microwave signals transmitted through the bale charge. Specifically, in several embodiments, the data analysis module 154 may be configured to calculate the dielectric properties associated with the bale charge being analyzed based on both the phase angle displacement of the microwave signals transmitted through the bale charge at two or more different frequencies and the wave attenuation of the microwave signals. Such dielectric properties may then be used to estimate or infer one or more additional properties associated with the bale charge, such as the moisture content or the density of the bale charge.

It should be appreciated that, although the data analysis module 154 is generally described herein as forming an integral portion of or otherwise being executed by the controller 140, the data analysis module 154 may, instead, form part of and/or may be configured to be executed by a separate processor-based device, such as a separate computing device. In such an embodiment, the data analysis module 154 (as included within or executed by the separate processor-based device) may be communicatively coupled to the controller 140 such that data may be transmitted between such devices, such as data received and/or generated by the data analysis module 154.

Additionally, it should be appreciated that, in several embodiments, the controller 140 may be configured to actively control the operation of one or more components of the disclosed system 100. For instance, in one embodiment, the controller 140 may be communicatively coupled to one or more control valves 158 for regulating the supply of hydraulic fluid to the actuators 52, 54 of the stuffer assembly 24. As such, the controller 140 may be configured to actively control the operation of the stuffer assembly 24, thereby allowing the controller 140 to regulate when the current bale charge being formed within the pre-compression 22 is delivered to the main baling chamber 26. For example, the controller 140 may be configured to actively monitor the filling degree of a given region of the pre-compression chamber 22 (e.g., the upper region 134) and/or the overall filling degree of the of the pre-compression chamber 22 to determine when such filling degree exceed a given filling degree or fullness threshold. Once it is determined that the monitored filling degree is equal to or exceeds the desired threshold, the stuffer forks 28 may be actuated (via control of the operation of the stuffer actuators 52, 54) to push the bale charge from the pre-compression chamber 22 and into the main baling chamber 26.

In several embodiments, the controller 140 may also be configured to actively control the operation of the microwave generator 106 of the sensor assembly 102. For instance, the controller 140 may be configured to control the operation of the microwave generator 106 such that microwave signals of a given frequency (or microwave signals at differing frequencies) are transmitted through each bale charge being analyzed. Specifically, in one embodiment, the controller 140 may be configured to control the operation of the microwave generator 106 such that a first microwave signal is initially transmitted through the current bale charge at a first frequency (e.g., 2 GHz) and then a second microwave signal is transmitted through the bale charge at a second frequency (e.g., 4 GHz) that differs from the first frequency. As will be described below, by transmitting microwave signals through the bale charge at the differing frequencies, microwave-based data may be collected at each frequency, thereby allowing one or more desired properties of the bale charge to be determined in accordance with aspects of the present subject matter.

Moreover, as shown in FIG. 3, the controller 140 may also include a communications interface 160 to provide a means for the controller 140 to communicate with any of the various other system components described herein. For instance, one or more respective communicative links or interfaces 162 (e.g., one or more data buses) may be provided between the communications interface 160 and the sensor assembly 102 to allow microwave-based data to be transmitted from the sensor assembly 102 to the controller 140 and/or to allow the controller 140 to transmit control signals to the sensor assembly 102 for controlling the operation of the microwave generator 106. Similarly, one or more respective communicative links or interfaces 164 (e.g., one or more data buses) may be provided between the communications interface 160 and the control valve(s) 158 to allow control signals to be transmitted from the controller 140 to the valve(s) 158 for controlling the operation of the stuffer actuators 52, 54.

As indicated above, by determining the wave-related properties of the microwave signals transmitted through a bale charge located within the pre-compression chamber 22, the dielectric properties of the bale charge may be determined. Specifically, the real part of the dielectric constant may be determined as a function of the differential or displacement of the phase angles of the microwave signals at differing frequencies. For instance, both the phase angle differential between two microwave signals transmitted at differing frequencies through a bale charge and the real part of the dielectric constant of such bale charge can be expressed as a function of the velocity of the wave through the bale charge. Such expressions are provided below as Equations 1 and 2:

$$\Delta\varphi(f_1, f_2) = 2\pi(\Delta f)\frac{d}{v} \quad (1)$$

$$v = \frac{c}{\sqrt{\varepsilon'}} \quad (2)$$

wherein, $\Delta\varphi$ corresponds to the phase angle displacement or differential between the phase angles ($\varphi$) detected for a microwave signal transmitted through a bale charge at a first frequency ($f_1$) and a microwave signal transmitted through the bale charge at a second frequency ($f_2$), $\Delta f$ corresponds to the differential or difference between the first frequency ($f_1$) and the second frequency ($f_2$), d corresponds to the distance between the microwave transmitter 110 and the microwave receiver 112 (e.g., the width 128 of the bale charge), v corresponds to the velocity of the microwave signals through the bale charge, c corresponds to the speed of light, and $\varepsilon'$ corresponds to the real part of the dielectric constant associated with the bale charge.

By substituting the right side of Equation 2 (i.e., the speed of light (c) divided by the square root of the real part of the dielectric constant ($\varepsilon'$)) into Equation 1 for the wave velocity (v), the phase angle differential ($\Delta\varphi$) and the real part of the dielectric constant ($\varepsilon'$) can be expressed as a function of each other within a single mathematical relationship. For example, by solving the resulting equation for the real part of the dielectric constant ($\varepsilon'$), such dielectric property can be expressed as a function of the phase angle differential ($\Delta\varphi$) and the frequency differential ($\Delta f$) (Equation 3):

$$\varepsilon' = \left[\frac{\Delta\varphi c}{2\pi\Delta f d}\right]^2 \quad (3)$$

Thus, by detecting the phase angle of a microwave signal transmitted through a bale charge at two known frequencies, the real part of the dielectric constant associated with the bale charge can be calculated. The real part of the dielectric constant can then be used to calculate the imaginary part of the dielectric constant associated with the bale charge based on the determined wave attenuation for one of the microwave signals. For instance, the imaginary part of the dielectric constant for the bale charge can be calculated using the following expression (Equation 4):

$$\varepsilon'' = \frac{-A\lambda_0}{8.686\pi a}\sqrt{\varepsilon'} \quad (4)$$

wherein, $\varepsilon''$ corresponds to the imaginary part of the dielectric constant associated with the bale charge, A corresponds to the determined wave attenuation for microwave signals transmitted at the first frequency ($f_1$) or the second frequency ($f_2$), $\lambda_0$ corresponds to the wavelength of the microwave signal transmitted though the bale charge, d corresponds to the distance between the microwave transmitter and the microwave receiver (e.g., the width 128 of the bale charge), and $\varepsilon'$ corresponds to the real part of the dielectric constant associated with the bale charge.

Based on the determined dielectric properties associated with the bale charge, values for both the moisture content of the bale charge and the density of the bale charge may be calculated. Specifically, as is generally understood by those of ordinary skill in the art, a direct correlation (e.g., a quadratic relationship) may be established between the dielectric properties associated with the bale charge and the moisture content within the bale charge. Similarly, as is generally understood by those of ordinary skill in the art, a direct correlation (e.g., a linear relationship) may be established between the dielectric properties associated with the bale charge and the density of the bale charge. Thus, by determining the associated dielectric properties, the system controller 140 (e.g., the data analysis module 154) may calculate both a moisture content value and a density value for each bale charge being analyzed within the pre-compression chamber 22. Such moisture/density values may then be stored within the controller's memory 144 as described above (e.g., with the bale charge database 152).

It should be appreciated that the correlation or relationship between the dielectric properties and the bale charge moisture content and between the dielectric properties and the bale charge density may be stored within the controller 140 in any suitable form that allows the controller 140 to calculate the corresponding moisture content and density values for the bale charge being analyzed. For instance, such correlations or relationships may be stored as mathematical formulas or expressions or may be stored as suitable look-up tables within the controller's memory 144. Additionally, it should be appreciated that the relevant correlations or relationships may be established via routine experimentation. For instance, experimental trials may be conducted with various bale charges of known moisture content and density to establish the desired correlations or relationships between the dielectric properties and the bale charge moisture/density.

Figure 4:
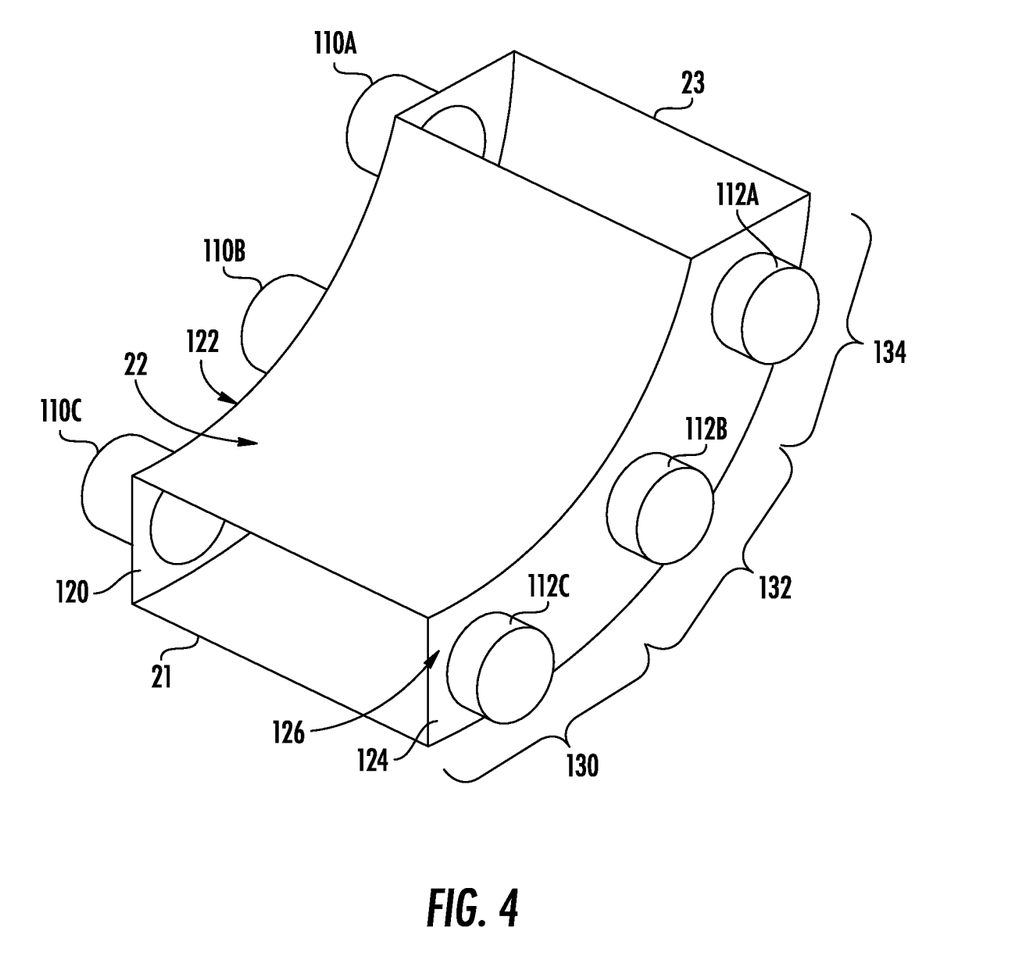
FIG. 4 illustrates a schematic view of another embodiment of a sensor arrangement suitable for use within one embodiment of the system shown in FIG. 3 in accordance with aspects of the present subject matter.

Referring now to FIG. 4, a partial, schematic view of another embodiment of the system 100 described above with reference to FIG. 3 is illustrated in accordance with aspects of the present subject matter, particularly illustrating an example sensor arrangement suitable for use within the disclosed system 100. Specifically, FIG. 4 illustrates an embodiment of the system 100 that includes several pairs of transmitter/receiver antennas 110, 112 spaced apart from one another along the length of pre-compression chamber 22 between its inlet 21 and its outlet 23.

For example, as shown in FIG. 4, a first pair of transmitter/receiver antennas 110A, 112A are positioned on opposed sides of the pre-compression chamber 22 so as to allow microwave signals to be transmitted through the crop material contained within the upper region 134 of the pre-compression chamber 22. Additionally, second and third pairs of transmitter/receiver antennas 110B, 112B, 110C, 112C are positioned on opposed sides of the pre-compression chamber 22 so as to allow microwave signals to be transmitted through the crop material contained within the central and lower regions 132, 130 of the pre-compression chamber 22, respectively. As a result, the illustrated sensor arrangement may allow for the filling degree or fullness of each region 130, 132, 134 of the pre-compression chamber 22 to be determined, which, in turn, may allow for the overall filling degree or fullness of the pre-compression chamber 22 to be estimated or inferred with a greater degree of confidence. Moreover, the illustrated sensor arrangement may also allow for various datapoints to be collected along the length of the pre-compression chamber 22 that are related to the moisture content and/or the density of the bale charge being formed within the chamber 22. Such measurements may then, for example, be averaged to determine an average moisture content and/or average density of the current bale charge located within the pre-compression chamber 22.

It should be appreciated that, in other embodiments, any other suitable sensor arrangement may be utilized within the disclosed system 100 in accordance with aspects of the present subject matter, including any combination of the pairs of antennas 110, 112. For instance, in another embodiment, the system 100 may include only the upper and central pairs of antennas 110A, 112A, 110B, 112B, or only the upper and lower pairs of antennas 110A, 112A, 110C, 112C, or only the central and lower pairs of antennas 110B, 112B, 110C, 112C. In yet another embodiment, the system 100 may include only the central pair of antennas 110B, 112B or only the lower pair of antennas 110C, 112C.

Figure 5:
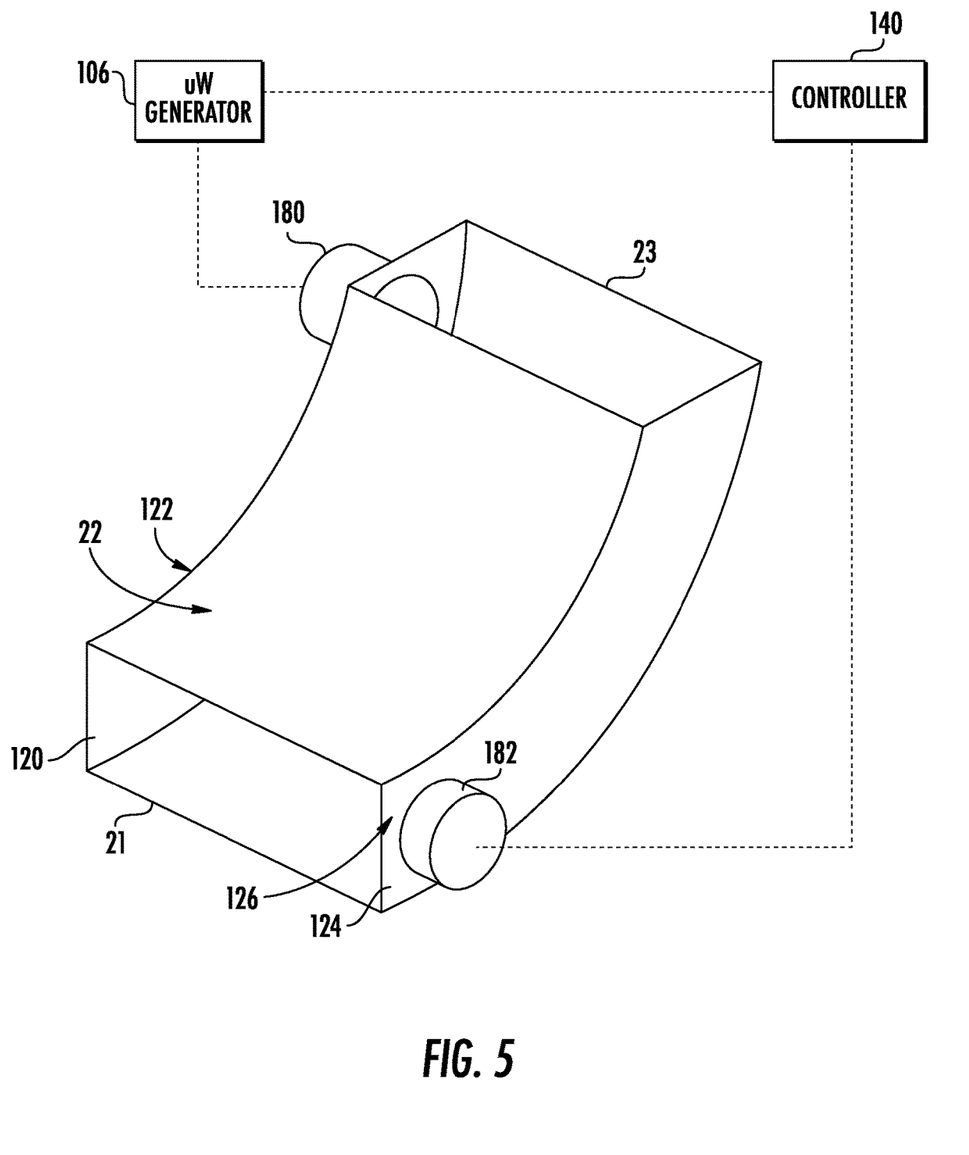
FIG. 5 illustrates a schematic view of a further embodiment of a sensor arrangement suitable for use within one embodiment of the system shown in FIG. 3 in accordance with aspects of the present subject matter.

Referring now to FIG. 5, another embodiment of the system 100 described above with reference to FIG. 3 is illustrated in accordance with aspects of the present subject matter. As shown, the system includes many of the same or similar components as that described above with reference to FIG. 3, such as the microwave generator 106 and the controller 140. However, unlike the embodiment of the system 100 described above that includes a pair of antennas 110, 112 configured to transmit microwave signals though a bale charge located within the pre-compression chamber 22 and subsequently receive such signals as transmitted through the bale charge, the system 100 shown in FIG. 5 includes a transmitter probe 180 coupled to the microwave generator 106 that is configured to transmit a microwave signal(s) through or into an adjacent wall of the pre-compression chamber 22 (e.g., the adjacent sidewall 120) in order to excite an electromagnetic resonance within the chamber 22. Specifically, in several embodiments, the pre-compression chamber 22 may be configured to function as a resonant cavity and, thus, may allow an electromagnetic resonance to excited within the chamber 22 via transmission of the microwave signal(s), with the resulting resonant frequency and its quality factor differing depending on the extent to which the pre-compression chamber is filled with crop material (e.g., with the shifts being due to the dielectric properties of the crop material inside the chamber). As such, by determining the resonant frequency shift and the quality factor associated with the electromagnetic resonance within the chamber 22 when excited by a microwave signal of a given input frequency, the real and imaginary part of the dielectric constant can be determined and thus, for example, the filling degree of the pre-compression chamber may be estimated or determined.

In one embodiment, the resonant frequency shift associated with the electromagnetic resonance within the chamber 22 when excited by a microwave signal of a given input frequency may be measured by the transmitter probe 180, itself. For instance, the transmitter probe 180 may be configured to measure or detect the amount of power absorbed by the pre-compression chamber when exciting the electromagnetic resonance with the microwave signals, which is directly indicative of the resonant frequency shift and the quality factor within the pre-compression chamber. Alternatively, as shown in FIG. 5, a secondary sensor probe 182 may be used to measure the resonant frequency at a different location along the pre-compression chamber (e.g., the opposed sidewall 124). The resonant frequency 182 measured by the secondary sensor probe 182 may then be used to determine the resonant frequency shift associated with the electromagnetic resonance within the chamber 22.

It should be appreciated that the quality factor associated with the electromagnetic resonance within the chamber 22 may generally be determined as a function of the resonant frequency and the resonant width (e.g., the ratio of the resonant frequency to the resonant width), with the resonant width being defined as the full width at half maximum power (i.e., the width of the resonance at half the maximum value of the measured power). For instance, in one embodiment, the quality factor may be expressed according to the following relationship (Equation 5):

$$Q = \frac{f_r}{\Delta f} \quad (5)$$

wherein, Q corresponds to the quality factor associated with the electromagnetic resonance within the chamber 22, $f_r$ corresponds to the resonant frequency associated with the electromagnetic resonance, and $\Delta f$ corresponds to the resonant width associated with the electromagnetic resonance.

It should also be appreciated that, in addition to determining the filling degree of the pre-compression chamber, the "resonant cavity" technique may also be used to determine or estimate one or more properties of the current bale charge being formed within the pre-compression chamber 22. For instance, by determining the resonant frequency shift and the quality factor associated with the electromagnetic resonance excited within the chamber 22 via the transmission of microwave signals through or into a wall(s) of the chamber, the dielectric properties associated with the bale charge (e.g., the real and imaginary parts of the dielectric constant associated with the bale) may be determined or estimated. Such dielectric properties may allow one or more related bale charge properties to be calculated, such as the moisture content of the bale charge and/or the density of the bale charge.

Figure 6:
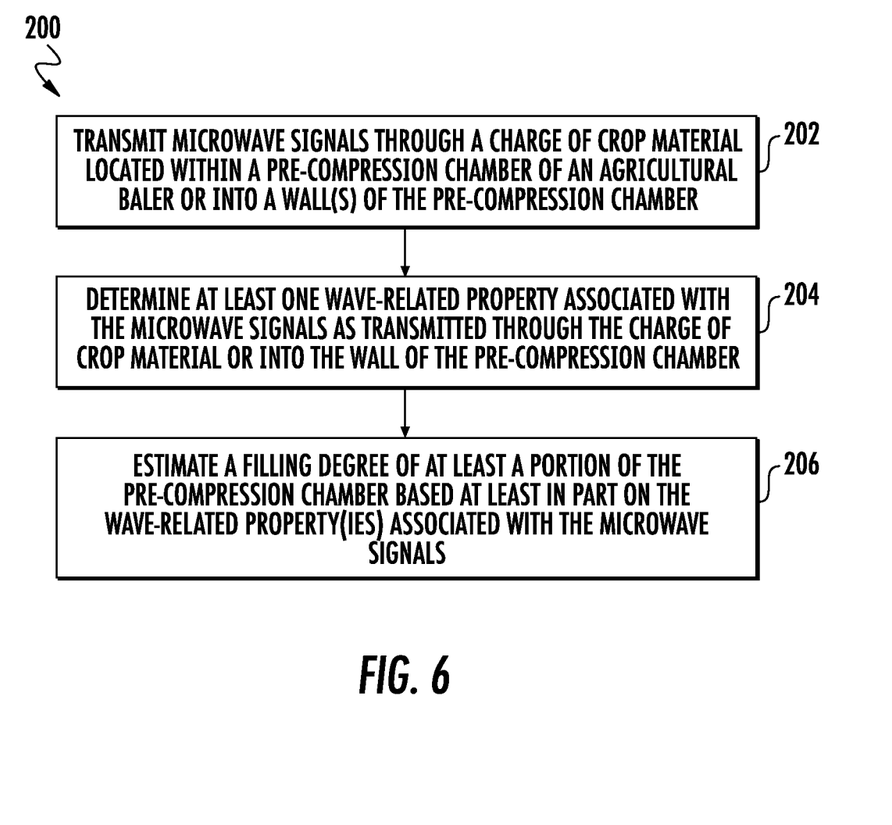
FIG. 6 illustrates a flow diagram of one embodiment of a method for determining one or more parameters of a charge of crop material formed within a pre-compression chamber of an agricultural baler in accordance with aspects of the present subject matter.

Referring now to FIG. 6, a flow diagram of one embodiment of a method 200 for determining one or more parameters associated with a bale charge located within a pre-compression chamber of an agricultural baler is illustrated in accordance with aspects of the present subject matter. In general, the method 200 will be described herein with reference to the baler 10 and the embodiments of the system 100 described above with reference to FIGS. 1-5. However, it should be appreciated by those of ordinary skill in the art that the disclosed method 200 may generally be implemented with any agricultural baler having any suitable baler configuration and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at 202, the method 200 includes transmitting microwave signals through a charge of crop material located within a pre-compression chamber of an agricultural baler or into a wall(s) of the pre-compression chamber. Specifically, as indicated above, a microwave sensor assembly 102 may be used to generate microwave signals for transmission through a bale charge to be analyzed, such as the current bale charge being formed within the pre-compression chamber 22 of the baler 10. For instance, the generated microwave signals may be transmitted through the bale charge via a transmitter antenna 110 of the sensor assembly 102 and subsequently received via a receiver antenna 112 of the sensor assembly 102. Alternatively, the generated microwave signals may be transmitted into a wall(s) of the pre-compression chamber 22 to excite an electromagnetic resonance within the chamber 22.

Additionally, at 204, the method 200 includes determining at least one wave-related property associated with the microwave signals as transmitted through the charge of crop material or into the wall of the pre-compression chamber. Specifically, as indicated above, the controller 140 may be configured to analyze the microwave-based data received from the sensor assembly 102 to determine one or more wave-related properties associated with the microwave signals detected by the receiver antenna 112, such as the phase angle and wave attenuation of each signal transmitted through the bale charge and subsequently received by the receiver antenna 112 of the sensor assembly 104. Alternatively, the controller 140 may be configured to determine one or more wave-related properties associated within the transmission of the microwave signals through the pre-compression chamber wall(s), such as the resonant frequency shift and the quality factor of the chamber 22 following excitation thereof.

Moreover, at 206, the method 200 includes estimating a filling degree of at least a portion of the pre-compression chamber based at least in part on the at least one wave-related property associated with the microwave signals. For example, as indicated above, the controller 140 may be configured to determine the filling degree of a given region of the pre-compression chamber 22 and/or the entire pre-compression chamber 22. Such a determination may, for instance, be made based on the wave attenuation of the microwave signals transmitted though the bale charge located within the pre-compression chamber or the resonant frequency shift within the pre-compression chamber 22 following excitation thereof. For instance, a look-up table or other relationship may be established that correlates the wave attenuation of the microwave signals (or the resonant frequency shift and/or the quality factor) to the filling degree of the pre-compression chamber 22. In this regard, by estimating the filling degree of the pre-compression chamber 22, the controller 140 may determine when the pre-compression chamber 22 is full or substantially full (e.g., by comparing the determined filling degree to a predetermined filling degree or fullness threshold). In the event that the determined filling degree is equal to or exceeds the predetermined threshold (thereby indicating that the pre-compression chamber 22 is full or substantially full), the controller 140 may actively control the operation of the stuffer assembly 24 to push the current bale charge from the pre-compression chamber 22 and into the main baling chamber 26. However, if it is, instead, determined that the current filling degree of the bale charge is less than the predetermined filling degree threshold (thereby indicating that the pre-compression chamber 22 is not full or substantially full), the controller 140 may delay actuating the stuffer assembly 24 to allow additional crop material to be supplied into pre-compression chamber 22.

It is to be understood that the steps of the method 200 are performed by the controller 140 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 140 described herein, such as the method 200, is implemented in software code or instructions which are tangibly stored on a tangible computer readable medium. The controller 140 loads the software code or instructions via a direct interface with the computer readable medium or via a wired and/or wireless network. Upon loading and executing such software code or instructions by the controller 140, the controller 140 may perform any of the functionality of the controller 140 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for determining parameters associated with bale charges formed within agricultural balers, the method comprising:
   transmitting microwave signals through a charge of crop material located within a pre-compression chamber of an agricultural baler or into a wall of the pre-compression chamber;
   determining, with one or more computing devices, at least one wave-related property associated with the microwave signals as transmitted through the charge of crop material or into the wall of the pre-compression chamber; and
   estimating, with the one or more computing devices, a filling degree of at least a portion of the pre-compression chamber based at least in part on the at least one wave-related property associated with the microwave signals, wherein the filling degree is an extent to which the pre-compression chamber is filled with crop material.

2. The method of claim 1, wherein transmitting the microwave signals comprises transmitting the microwave signals through the charge of crop material located within the pre-compression chamber, the method further comprising receiving the microwave signals as transmitted through the charge of crop material.

3. The method of claim 2, wherein determining the at least one wave-related property comprises determining at least one of a wave attenuation or a phase angle differential associated with the microwave signals as transmitted through the charge of crop material.

4. The method of claim 2, wherein determining the at least one wave-related property comprises determining a wave attenuation associated with the microwave signals as transmitted through the charge of crop material and further comprising comparing the wave attenuation to a predetermined attenuation threshold, wherein estimating the filling degree of the at least a portion of the pre-compression chamber comprises identifying that the pre-compression chamber is substantially full when the wave attenuation is equal to or exceeds the predetermined attenuation threshold.

5. The method of claim 1, wherein transmitting the microwave signals comprises transmitting the microwave signals into the wall of the pre-compression chamber to excite an electromagnetic resonance within the pre-compression chamber.

6. The method of claim 5, wherein determining the at least one wave-related property comprises determining at least one of a resonant frequency shift or a quality factor associated with the electromagnetic resonance.

7. The method of claim 1, further comprising:
comparing the estimated filling degree of the at least a portion of the pre-compression chamber to a predetermined filling degree threshold; and
identifying that the pre-compression chamber is substantially full when the estimated filling degree is at or above the predetermined filling degree threshold.

8. The method of claim 7, further comprising moving the charge of crop material from the pre-compression chamber into a main baling chamber of the agricultural baler upon identification of the pre-compression chamber being substantially full.

9. The method of claim 8, wherein moving the charge of crop material comprises controlling an operation of a stuffer assembly of the agricultural baler to push the charge of crop material from the pre-compression chamber into the baling chamber of the agricultural baler.

10. The method of claim 1, further comprising determining a bale charge property of the charge of crop material located within the pre-compression chamber based at least in part on the at least one wave-related property.

11. A system for determining parameters associated with bale charges formed within an agricultural baler, the system comprising:
a pre-compression chamber of the agricultural baler;
a transmitter configured to transmit microwave signals through a charge crop material located within the pre-compression chamber or into a wall of the pre-compression chamber; and
a controller configured to:
determine at least one wave-related property associated with the microwave signals as transmitted through the charge of crop material or into the wall of the pre-compression chamber; and
estimate a filling degree of at least a portion of the pre-compression chamber based at least in part on the at least one wave-related property associated with the microwave signals, wherein the filling degree is an extent to which the pre-compression chamber is filled with crop material.

12. The system of claim 11, wherein the transmitter comprises a transmitter antenna configured to transmit the microwave signals through the charge of crop material and further comprising a receiver antenna configured to receive the microwave signals as transmitted through the charge of crop material, the receiver antenna being communicatively coupled to the controller.

13. The system of claim 12, wherein the transmitter antenna and the receiver antenna are positioned along opposed sides of the pre-compression chamber such that microwave signals transmitted by the transmitter antenna pass through the charge of crop material prior to being received by the receiver antenna.

14. The system of claim 12, wherein the controller is configured to determine at least one of a wave attenuation or a phase angle differential associated with the microwave signals as transmitted through the charge of crop material.

15. The system of claim 14, wherein the controller is further configured to compare the wave attenuation to a predetermined attenuation threshold and identify that the pre-compression chamber is substantially full when the wave attenuation is equal to or exceeds the predetermined attenuation threshold.

16. The system of claim 11, wherein transmitter comprises a transmitter probe configured to transmit the microwave signals into the wall of the pre-compression chamber to excite an electromagnetic resonance within the pre-compression chamber.

17. The system of claim 16, wherein the at least one wave-related property comprises at least one of a resonant frequency shift or a quality factor associated with the electromagnetic resonance.

18. The system of claim 11, further comprising a stuffer assembly configured to push the charge of crop material from the pre-compression chamber into a main baling chamber of the agricultural baler, the controller being configured to control an operation of the stuffer assembly such that the charge of crop material is pushed into the main baling chamber when the estimated filling degree indicates that the pre-compression chamber is substantially full.

19. The system of claim 11, wherein the controller is further configured to determine a bale charge property of the charge of crop material located within the pre-compression chamber based at least in part on the at least one wave-related property.

* * * * *